Figure 1:
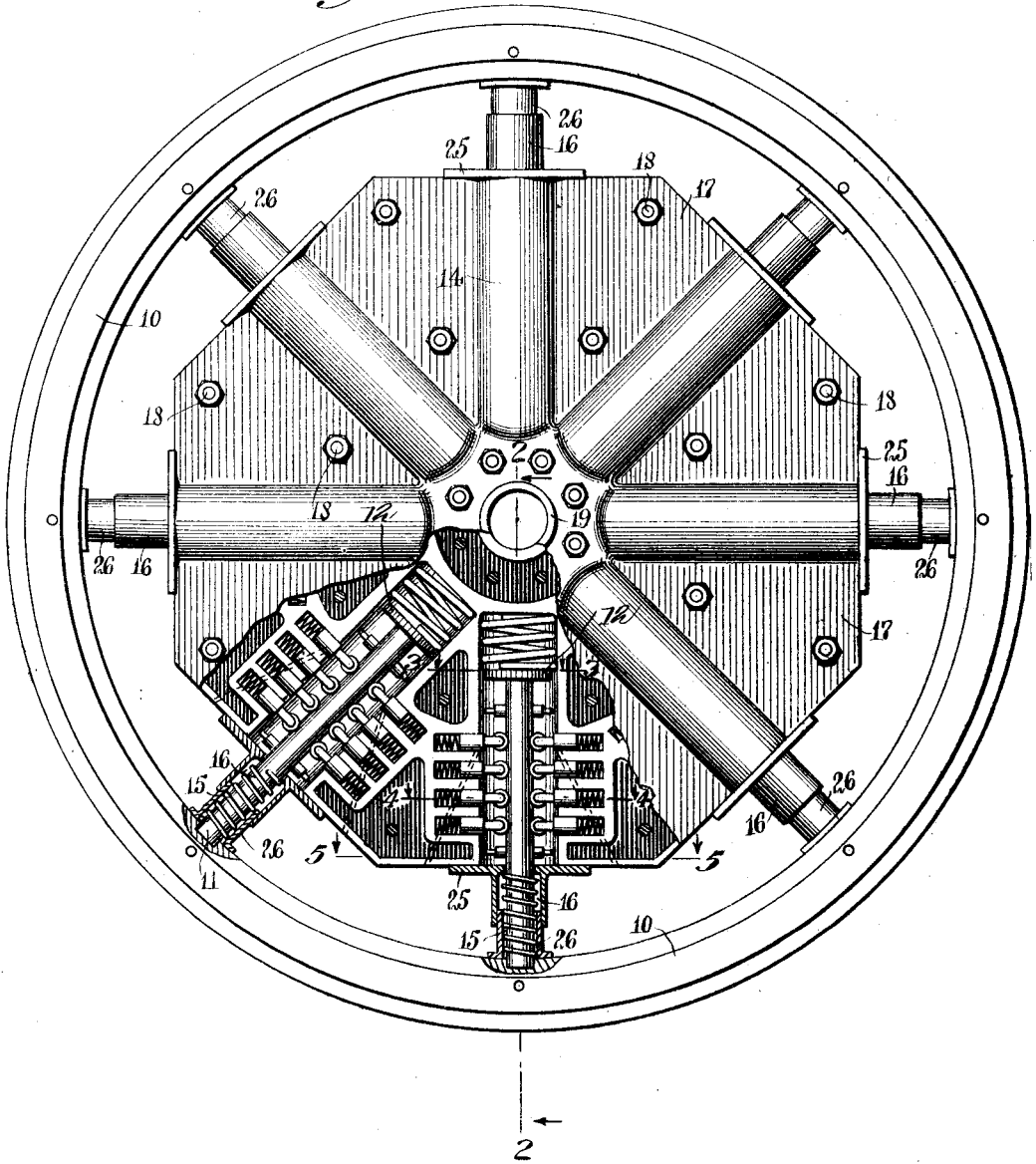

F. F. TIGHE.
RESILIENT WHEEL.
APPLICATION FILED AUG. 24, 1911.

1,055,835.

Patented Mar. 11, 1913.

2 SHEETS—SHEET 1.

WITNESSES

INVENTOR
Fredrick F. Tighe
BY
ATTORNEYS

F. F. TIGHE.
RESILIENT WHEEL.
APPLICATION FILED AUG. 24, 1911.
1,055,835.
Patented Mar. 11, 1913.
2 SHEETS—SHEET 2.
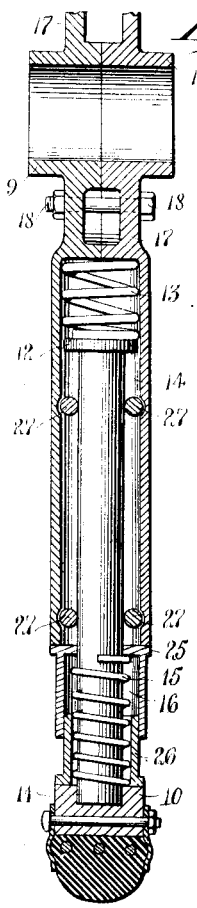
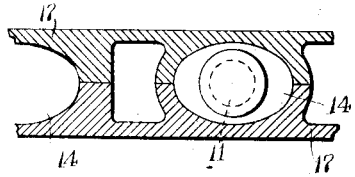
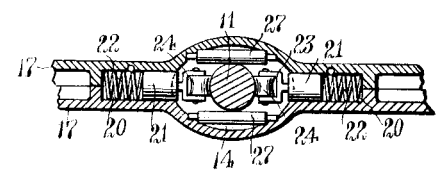
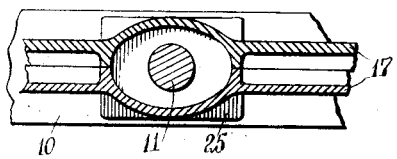
WITNESSES
INVENTOR
Fredrick F. Tighe
BY
ATTORNEYS

UNITED STATES PATENT OFFICE.

FREDRICK F. TIGHE, OF NEW YORK, N. Y.

RESILIENT WHEEL.

1,055,835.     Specification of Letters Patent.     Patented Mar. 11, 1913.

Application filed August 24, 1911. Serial No. 645,700.

*To all whom it may concern:*

Be it known that I, FREDRICK F. TIGHE, a citizen of the United States, and a resident of the city of New York, borough of Manhattan, in the county and State of New York, have invented a new and Improved Resilient Wheel, of which the following is a full, clear, and exact description.

Among the principal objects which the present invention has in view are: to provide a wheel having a rigid rim section and a rigid hub section operatively connected by a resilient structure; to provide in a structure of the character above mentioned rigid spokes converging toward a common center and resilient guide members to maintain the said spokes in line with the center of said hub section; and to provide a construction for a wheel of the character mentioned which is simple, efficient and durable.

One embodiment of the present invention is disclosed in the structure illustrated in the accompanying drawings, in which like characters of reference denote corresponding parts in all the views, and in which—

Figure 1 is a side view of a wheel constructed and arranged in accordance with the present invention, a portion of the cover plate for the hub section being removed; Fig. 2 is a cross section, on an enlarged scale, of a fragment of the wheel, the section being taken on the line 2—2 in Fig. 1; Fig. 3 is a detail view, in section and on an enlarged scale, the section being taken on the line 3—3 in Fig. 1; Fig. 4 is a detail view, in section and on an enlarged scale, the section being taken on the line 4—4 in Fig. 1; and Fig. 5 is a detail view, in section and on an enlarged scale, the section being taken on the line 5—5 in Fig. 1.

As shown in the accompanying drawings the rim 10 is provided with a series of spokes 11 fixedly mounted thereon. The spokes 11 are set radially on the rim 10, as shown. Each spoke is provided at the inner end with a disk or flange 12 to form a piston-like head to receive the thrust of a spiral spring 13. The springs 13 are each disposed at the inner end of a cylindrical chamber 14. The size and tension of the springs 13 vary to suit the needs of the work to which they are to be devoted. The major portion of the weight of the vehicle is supported by the combined springs 13. The springs 13 are, in their operation, supplemented by the spiral springs 15, each of which is wound about the outer end of one of the spokes 11 to bear upon the rim 10 at one end thereof and against the inner end of the cylinder pocket 16. When the wheel is mounted and operated a large portion of the weight of the load is carried upon these springs.

The cylindrical chambers 14 are formed in the plates 17. Each plate 17 is a complete half section, being preferably constructed from cast metal and parted at the center of the wheel. As shown best in Fig. 1 of the drawing the casting is arranged to form in each of the said plates a complete half section of the cylindrical chamber 14. The plates 17 are held together by means of bolts 18, 18. At the center of the plates 17 are provided collar flanges 19 which, when alined and combined, form a receptacle for the axle box of the vehicle. Opening laterally from and disposed perpendicularly to the chambers 14 are small chambers 20 which constitute guides for the plungers 21 and a receptacle for the spiral springs 22 against which the plungers 21 rest. There may be any number of plungers 21 and springs 22 therefor, and the thrust of the combined plungers operates to hold central the spokes 11. To form a bearing for the plungers 21 there is provided on each plunger a yoke 23, which yoke forms a bearing for a roller 24. The rollers 24 are hollowed at their periphery to a shape substantially the same as the surface of the spokes 11. By this means the plungers 21 and the springs 22 may exert a pressure on the spokes 11 perpendicular to this direction of movement without jamming or binding the said spokes in their individual action. It will be understood that the torque strain on the wheel will be absorbed by the springs 22, 22.

To permit the spokes to move circumferentially when the springs 22 are compressed there is provided for each spoke a sliding plate 25. It is upon each of the sliding plates 25 that the cups constituting the pockets 16 are formed. The perforation or opening in the top of each of the pockets 16 snugly fits a spoke 11. The plate 25 completely covers the opening of the chamber 14, rendering the same thereby dust-proof.

Alined with and guided by each of the pockets 16 is a thimble 26. Each of the thimbles 26 is rigidly secured to the rim 10, as shown best in Fig. 1 of the drawings, and forms a housing for each of the springs 15.

While it is the design to permit the plates 17 and hub structure connected therewith, and the rim 10 and members connected therewith, to move independently in a circumferential direction, it is not the purpose to permit of any movement transversely. To hold the spokes centered in their transverse position while avoiding the danger of jamming the same there is provided for each spoke, and journaled in each of the chambers 14, rollers 27 which bear against the sides of the spoke, as shown best in Fig. 4 of the drawings.

When the wheel is used as a free running wheel the operation of the plungers 21 and springs 22 is called into play to overcome climbing thrusts, as when a wheel strikes an obstruction in the road. When, however, the wheel is employed as a driving wheel, the torque thrust of the axle section will be exerted upon the various spokes through the intermediary of the plungers 21 and springs 22. It is obvious that the greater the pull or torque of the wheel the greater will be the compression of the springs 22. The variation in pressure on the springs 22 and the variation in circumferential movement of the spokes are provided for by the plate 25 which slides on the perimeter of the joined plates 17. It will be noted in this connection that the flange 12 is constructed to a lesser diameter than the long diameter of the chambers 14.

Having thus described my invention, what I claim as new and desire to secure by Letters Patent is:—

A wheel of the character described, comprising a rigid central portion embodying a hub for said wheel and having radially-disposed in surrounding relation to said hub a plurality of spoke-holding chambers; a wheel rim circumjacent to said central portion; a plurality of spokes operatively connecting said rim and said central portion, said spokes operating in said chambers and in guided relation thereto; a plurality of cushion springs interposed between the ends of each of said chambers and each of said spokes, to maintain said rim normally concentric with said central portion; a plurality of reciprocating guides for each of said spokes, said guides being disposed perpendicular to said spokes and at opposite sides thereof; and a plurality of cushion springs disposed between said guides and said frame, to normally maintain said spokes concentric with said chambers, the combined strength of said cushion springs exceeding the torque of the wheel.

In testimony whereof I have signed my name to this specification in the presence of two subscribing witnesses.

FREDRICK F. TIGHE.

Witnesses:
E. F. Murdock,
J. J. McCormick.